US008315244B2

(12) United States Patent
Nieto et al.

(10) Patent No.: US 8,315,244 B2
(45) Date of Patent: Nov. 20, 2012

(54) WIRELESS COMMUNICATION SYSTEM WITH SELECTIVE PREAMBLE SYNCHRONIZATION PORTION AND RELATED METHODS

(75) Inventors: John W. Nieto, Rochester, NY (US); William N. Furman, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 413 days.

(21) Appl. No.: 12/816,888

(22) Filed: Jun. 16, 2010

(65) Prior Publication Data

US 2011/0310880 A1   Dec. 22, 2011

(51) Int. Cl.
*H04J 3/06* (2006.01)
(52) U.S. Cl. ........................................ 370/350; 370/503
(58) Field of Classification Search .................. 370/351, 370/389, 395.1, 395.4, 464, 498, 503, 507, 370/509, 510, 511, 512, 513, 514
See application file for complete search history.

(56) References Cited

U.S. PATENT DOCUMENTS

| | | | | |
|---|---|---|---|---|
| 5,363,376 | A * | 11/1994 | Chuang et al. | 370/332 |
| 5,943,325 | A * | 8/1999 | Hadar et al. | 370/324 |
| 6,014,385 | A | 1/2000 | Ayanoglu et al. | 370/458 |
| 6,560,321 | B1 | 5/2003 | Chen et al. | 379/100.17 |
| 6,853,681 | B1 | 2/2005 | Lindoff | 375/231 |
| 6,959,010 | B1 | 10/2005 | Bahrenburg et al. | 370/503 |
| 2007/0160088 | A1* | 7/2007 | Kanazashi | 370/503 |
| 2010/0061493 | A1* | 3/2010 | Takahashi et al. | 375/343 |

* cited by examiner

*Primary Examiner* — Obaidul Huq
(74) *Attorney, Agent, or Firm* — Allen, Dyer, Doppelt, Milbrath & Gilchrist, P.A.

(57) ABSTRACT

A wireless communications device may include a transceiver, a memory configured to store a predetermined set of preamble synchronization portions, each preamble synchronization portion having a different length, and a controller cooperating with the transceiver and the memory. The controller may be configured to receive forward transmission blocks, each forward transmission block having a preamble synchronization portion and a body portion associated therewith. The preamble synchronization portion may include a desired preamble synchronization portion from among the predetermined set of preamble synchronization portions. The controller may be configured to determine and use, for each received forward transmission block, the corresponding preamble synchronization portion from among the predetermined set of preamble synchronization portions.

36 Claims, 4 Drawing Sheets

WIRELESS COMMUNICATION SYSTEM WITH SELECTIVE PREAMBLE SYNCHRONIZATION PORTION AND RELATED METHODS

FIELD OF THE INVENTION

The present invention relates to the field of wireless communications, and, more particularly, to preamble synchronization portions in wireless communications and related methods.

BACKGROUND OF THE INVENTION

A typical wireless communication system comprises a plurality of wireless communications devices exchanging data with each other. In some wireless communication systems, for example, infrastructure networks, the system may further comprise a wireless base station for managing communications between the wireless communications devices. In other words, each intra-system communication would be exchanged via the wireless base station. In other wireless communication systems, for example, mesh networks and ad hoc wireless networks, the wireless base station may be omitted, i.e. the wireless communications devices may communicate directly with each other.

In certain advantageous wireless communication systems, the transmitted data is packetized. More specifically, the data is formatted into groups of packets for transmission. Each group of packets is transmitted via a forward transmission, which is comprised of a preamble portion and a body portion associated therewith, i.e. a forward transmission block. The body portion is commonly known as the payload and typically comprises user generated data, i.e. groups of packets. The preamble portion may include control information. The control information may contain information the wireless communication system uses to deliver the user data, for example, source and destination addresses, error detection codes such as checksums, sequencing information, and synchronization information. As will be appreciated by those skilled in the art, the preamble portion may include a synchronization sequence for the synchronization information.

In the typical wireless communication system, the preamble portion may have a fixed length. The typical wireless communication system may employ a preamble portion having a minimum length to accommodate for the most difficult transmission scenario, i.e. poor transmission channel and a variety of low latency data services. For example, the most difficult transmission scenario may comprise receiving 75 bits per second with a signal-to-noise ratio of −10 dB with NATO Standardization Agreement (STANAG) 4415 channel conditions. A potential drawback to this approach is that it increases the overhead of the wireless communication system to unnecessary levels for nominal transmissions, i.e. a greater percentage of each forward transmission block is used for control information. Another approach is to choose a preamble portion length capable of accommodating the mean transmission scenario. A potential drawback to this approach is that more problematic transmission scenarios may exceed the capabilities of the preamble portion, i.e. the transmission fails.

An approach is disclosed in U.S. Pat. No. 6,014,385 to Ayanoglu et al. This method includes transmitting a training sequence for synchronization and equalization prior to transmitting a forward transmission. The length of the training sequence may vary from terminal-to-terminal and temporally and based upon whether the terminals are fixed or mobile, the modulation scheme used, the carrier frequency, the bit error rate of previous transmissions, and the weather and topology of the terrain near the terminals. A drawback to this approach may be that synchronization sequences must be propagated throughout the network to be used.

SUMMARY OF THE INVENTION

In view of the foregoing background, it is therefore an object of the present invention to provide an efficient wireless communication system.

This and other objects, features, and advantages in accordance with the present invention are provided by a wireless communication system that comprises a first wireless communications device comprising a first transceiver and a first controller cooperating therewith. The first controller is configured to determine at least one received signal characteristic, generate each forward transmission block for transmission having a preamble synchronization portion and a body portion associated therewith, and select for each forward transmission block a desired preamble synchronization portion from among a predetermined set of preamble synchronization portions and based upon the at least one received signal characteristic. Each preamble synchronization portion among the predetermined set thereof has a different length. The wireless communication system includes a second wireless communications device in communication with the first wireless communications device and comprising a second transceiver and a second controller cooperating therewith and configured to determine and use, for each forward transmission block, the corresponding preamble synchronization portion from among the predetermined set of preamble synchronization portions. Advantageously, the wireless communication system uses a preamble portion tailored to the transmission channel conditions.

In other embodiments, the first controller may be configured to select for each forward transmission block the desired preamble synchronization portion further based upon a data rate for transmission. More specifically, the first controller may be configured to select a desired shortest preamble synchronization portion from among the predetermined set thereof for a given at least one received signal characteristic.

The predetermined set of preamble synchronization portions may have correlations with each other below a threshold. For example, the at least one received signal characteristic may comprise at least one of a signal-to-noise ratio, a multipath characteristic, a Doppler spread characteristic, and an interference characteristic.

In some embodiments, the predetermined set of preamble synchronization portions may comprise a series thereof with each successive preamble synchronization portion incorporating previous preamble synchronization portions. For example, the predetermined set of preamble synchronization portions may comprise at least one of a 128 modulated symbol preamble portion, a 384 modulated symbol preamble portion, and an 896 modulated symbol preamble portion.

Another aspect is directed to a wireless communications device that comprises a transceiver, and a controller cooperating with the transceiver. The controller is configured to determine at least one received signal characteristic, generate each forward transmission block for transmission having a preamble synchronization portion and a body portion associated therewith, and select for each forward transmission block a desired preamble synchronization portion from among a predetermined set of preamble synchronization portions and based upon the at least one received signal characteristic. Each preamble synchronization portion among the predetermined set thereof has a different length. The controller is configured to transmit each forward transmission block to a receiver wireless communications device, the receiver wireless communications device determining and using, for each forward transmission block, the corresponding preamble synchronization portion from among the predetermined set of preamble synchronization portions.

Another aspect is directed to a method of operating a wireless communication system including a first wireless communications device and a second wireless communications device in communication therewith. The method includes determining at least one received signal characteristic at the first wireless communications device, and generating each forward transmission block for transmission from the first wireless communications device to the second wireless communications device, each forward transmission block having a preamble synchronization portion and a body portion associated therewith. The method further includes using the first wireless communications device to select for each forward transmission block a desired preamble synchronization portion from among a predetermined set of preamble synchronization portions and based upon the at least one received signal characteristic. Each preamble synchronization portion among the predetermined set thereof has a different length. The method also includes at the second wireless communications device, determining and using, for each forward transmission block, the corresponding preamble synchronization portion from among the predetermined set of preamble synchronization portions.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
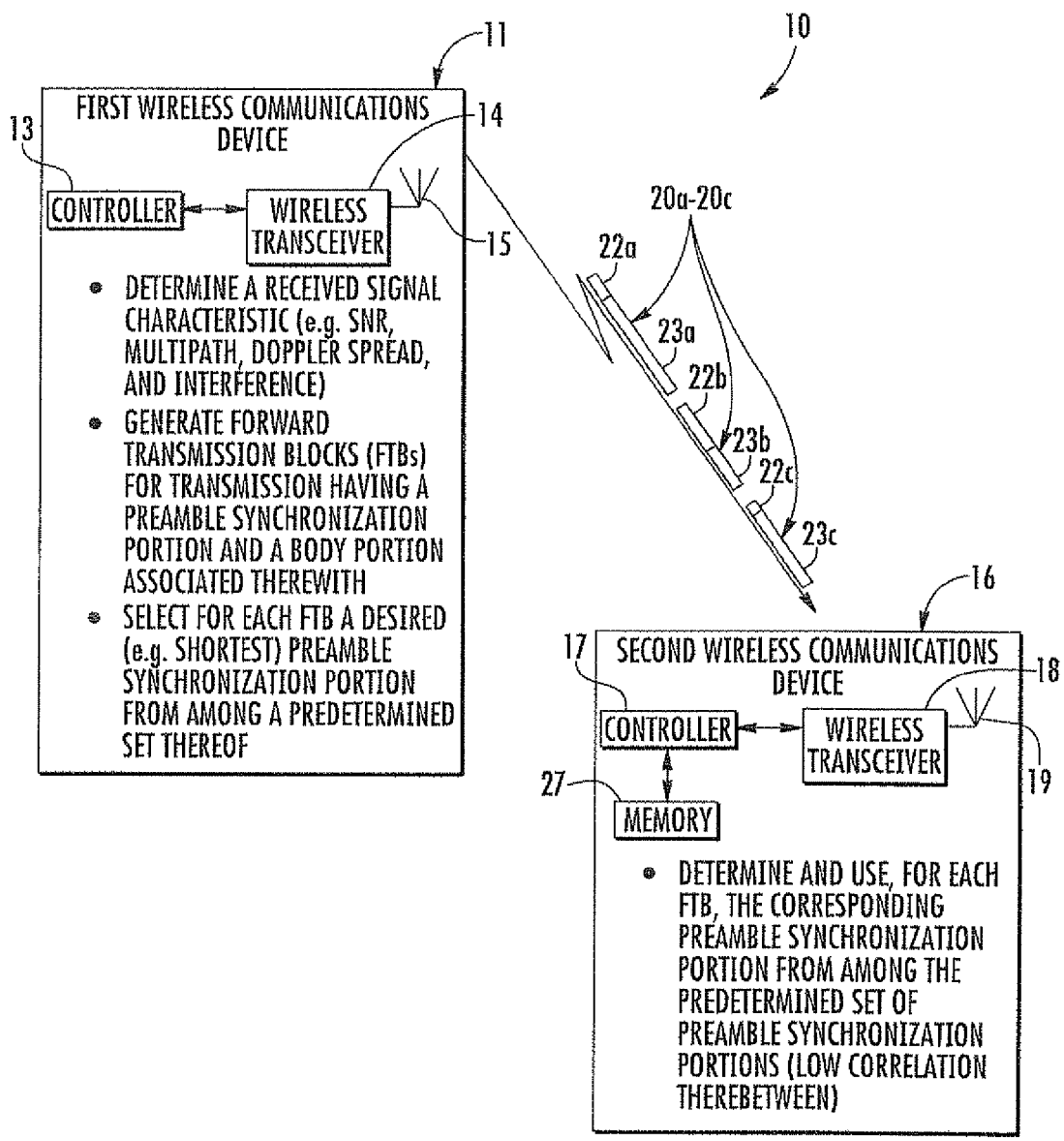
FIG. 1 is a schematic diagram of a wireless communication system, according to the present invention.
Figure 2:
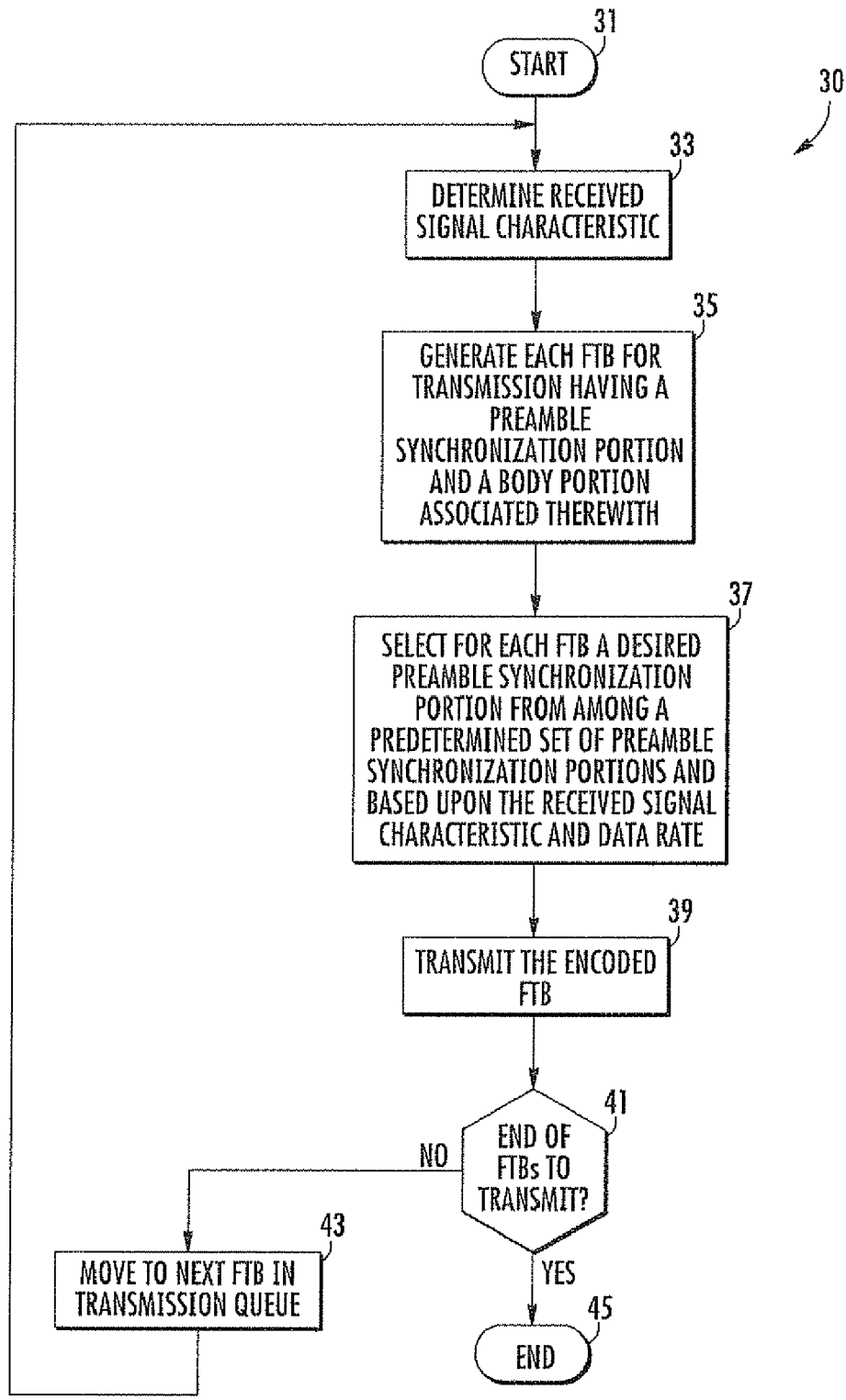
FIG. 2 is a flowchart illustrating operation of the first wireless communications device of FIG. 1.

Referring to FIGS. 1-2, a wireless communication system 10 according to the present invention is now described. The wireless communication system 10 illustratively includes a first wireless communications device 11, and a second wireless communications device 16 communicating therewith. Furthermore, a flowchart 30 illustrates a method of operation of the first wireless communications device 11, which begins at Block 31. The first wireless communications device 11 illustratively includes an antenna 15, a transceiver 14 coupled to the antenna, and a controller 13 coupled to the transceiver.

The second wireless communications device 16 illustratively includes an antenna 19, a transceiver 18 coupled to the antenna, a memory 27, and a controller 17 coupled to the transceiver and the memory. As will be appreciated by those skilled in the art, the first and second wireless communications devices 11, 16 may include a plurality of differing types of wireless communications devices modified according to the teachings herein, for example, the Falcon III/117G ANW2, or SBR/SPR, as available from the Harris Corporation of Melbourne, Fla., the assignee of the present application.

As will be appreciated by those skilled in the art, the first wireless communications device 11 is provided with a queue of data for transmission to the second wireless communications device 16. The first controller 13 is configured to organize the data for transmission into forward transmission blocks, i.e. groups of packets, 20a-20c of data. Each forward transmission block 20a-20c illustratively includes a preamble synchronization portion 22a-22c and an associated body portion 23a-23c. As will be appreciated by those skilled in the art, the preamble synchronization portion 22a-22c may include at least one of a header portion, a channel estimate portion, and a mini-probe portion.

As will be appreciated by those skilled in the art, the first controller 13 may encode each forward transmission block 20a-20c using a modulation waveform, which would need to be modified according to the teachings herein, comprising at least one of an Advanced Networking Wideband Waveform (ANW2), a Single Channel Ground and Airborne Radio System (SINCGARS) waveform, a HAVEQUICK waveform, and a VULOS-Demand Assigned Multiple Access (DANA) waveform, for example. Of course, other modulation waveforms may be used.

The first controller 13 is illustratively configured to determine at least one received signal characteristic, i.e. the first controller determines the transmission channel characteristics between the two wireless communications devices 11, 16 (Block 33). For example, the first controller 13 may determine at least one of a signal-to-noise ratio, a multipath characteristic, a Doppler spread characteristic, and an interference characteristic. In other embodiments, the first wireless communications device 11 could collect other characteristics. Once the at least one received signal characteristic is determined, the first controller 13 formats data for transmission in the aforementioned forward transmission blocks (Block 35).

Figure 4:
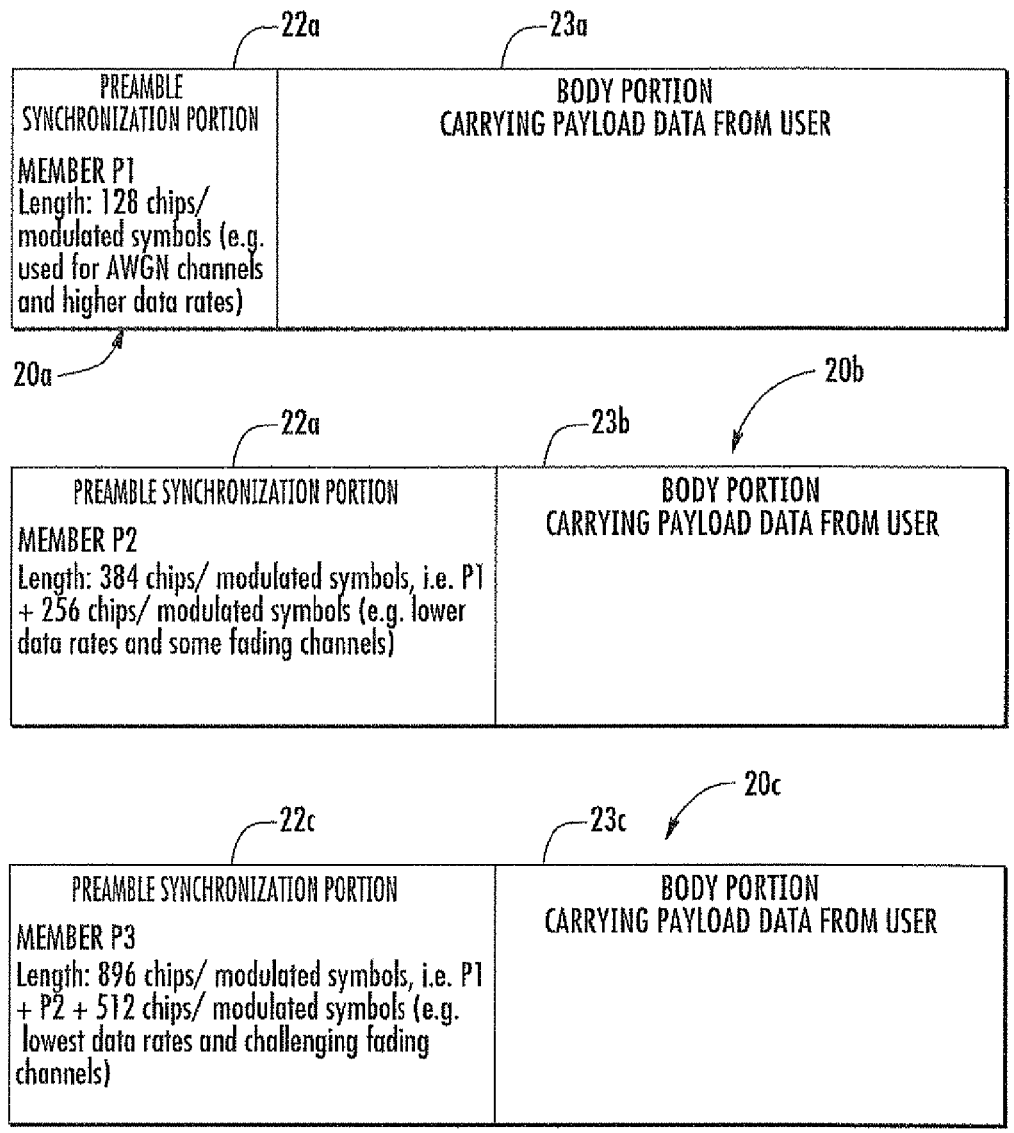
FIG. 4 is a schematic diagram of a stream of forward transmission blocks using the predetermined set of preamble synchronization portions from the wireless communication system of FIG. 1.

Referring additionally to FIG. 4, the first and second controllers 13, 17 are configured to use a predetermined set of preamble synchronization portions 22a-22c for association with accompanying body portions 23a-23c. The predetermined set of preamble synchronization portions 22a-22c may have correlations with each other below a threshold. In other words, each of the preamble synchronization portions 22a-22c has differing data symbols. Advantageously, this readily enables the second wireless communications device 16 to determine which preamble synchronization portion is being used for a received forward transmission block 20a-20c.

In the illustrated embodiment, the predetermined set of preamble synchronization portions 22a-22c illustratively includes a series of preamble synchronization portions with each successive preamble synchronization portion incorporating previous preamble synchronization portions. Specifically, in the illustrated embodiment, the predetermined set includes three members: P1, P2, and P3. The predetermined set of preamble synchronization portions 22a-22c illustratively includes a 128 modulated symbol preamble portion 22a (P1), a 384 modulated symbol preamble portion 22b (P2), and an 896 modulated symbol preamble portion 22c (P3). As can be seen, preamble synchronization portion P3=P1+P2+512 chips/modulated symbols (896 chips/modulated symbols); P2=P1+256 chips/modulated symbols (384 chips/modulated symbols); and P1=128 chips/modulated symbols.

Of course, in other embodiments, the predetermined set of preamble synchronization portions 22a-22c may include more or less than three members. Further, the illustrated series arrangement for the predetermined set of preamble synchronization portions 22a-22c is optional.

Furthermore, the first controller 13 is illustratively configured to select for each forward transmission block 20a-20c a desired preamble synchronization portion from among the predetermined set of preamble synchronization portions 22a-22c and based upon the at least one received signal characteristic (Block 37). More specifically, the first controller 13 is configured to select a desired shortest preamble synchronization portion from among the predetermined set 22a-22c thereof for a given at least one received signal characteristic.

In the illustrated embodiment, the first controller 13 is further configured to select for each forward transmission block 20a-20c the desired preamble synchronization portion further based upon a data rate for transmission. For example, a shorter preamble is required for the waveforms providing the highest data rates as the signal-to-noise ratio (SNR) required for these waveforms will be higher than the SNR required for the lower data rate waveforms. In other embodiments, the first controller 13 could be configured to use only one of the received signal characteristic and the data rate for transmission to select the desired preamble synchronization portion for each forward transmission block 20a-20c.

For example, the first controller 13 would select the shortest preamble synchronization portion (P1) for relatively good transmission channel conditions, i.e. perhaps a channel with only additive white Gaussian noise, and greater data rates. The first controller 13 would select the longer preamble synchronization portion (P3) for relatively bad transmission channel conditions, i.e. significant fading and lower data rates.

Since each preamble synchronization portion 22a-22c among the predetermined set thereof has a different length, the first controller 13 selects the preamble synchronization portion that best matches the data rate for transmission and the current channel characteristics. Once the first controller 13 has determined the desired preamble synchronization portion, the first wireless communications device 11 transmits the encoded forward transmission block 20a-20c to the second wireless communications device 16 (Block 39). Once the forward transmission block 20a-20c has been transmitted, the first controller 13 proceeds to the next forward transmission block in the transmission queue (Blocks 41 & 43). If the queue has been exhausted, the process for the first controller 13 illustratively ends at Block 45.

Figure 3:
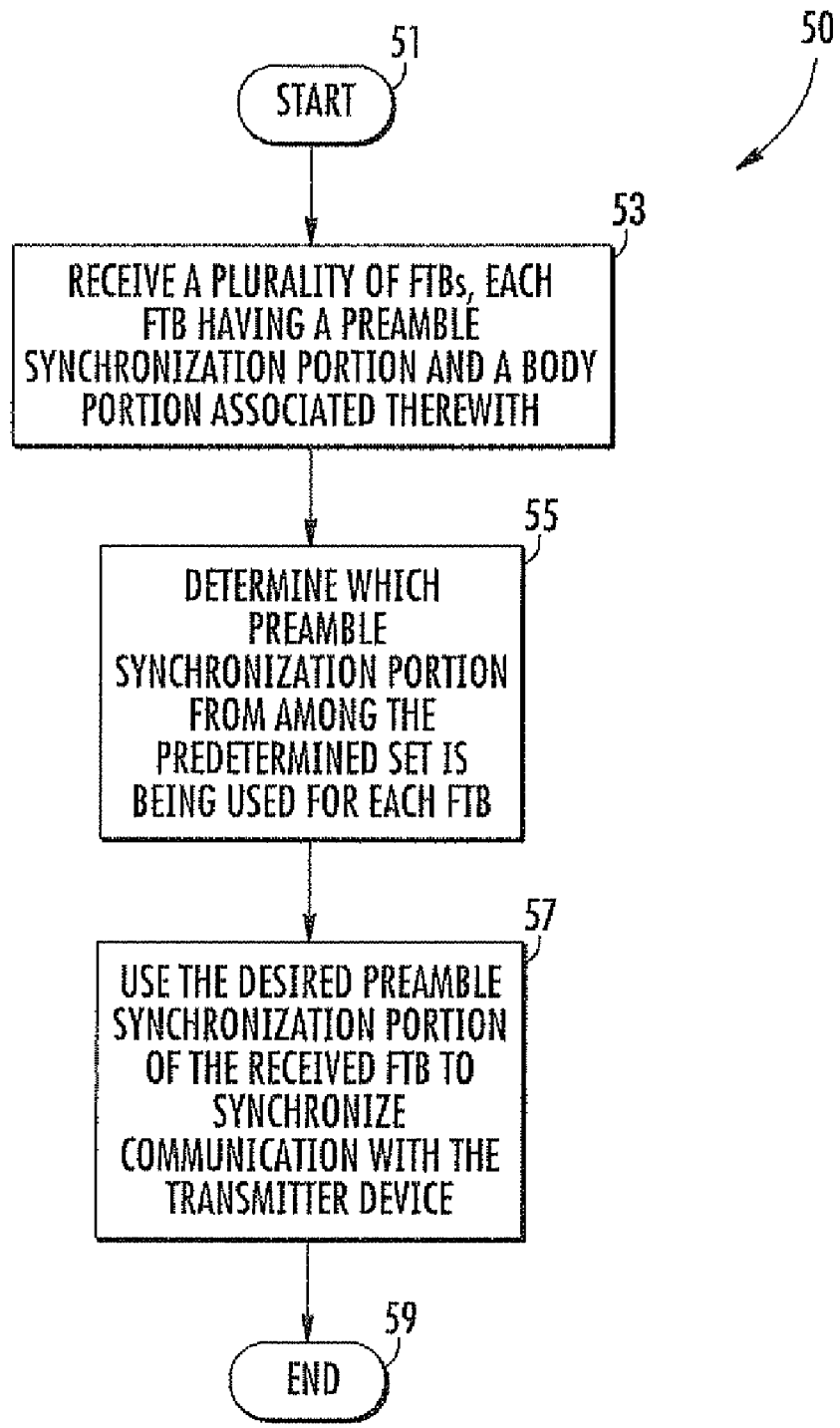
FIG. 3 is a flowchart illustrating operation of the second wireless communications device of FIG. 1.

Referring now additionally to FIG. 3, a second flowchart 50 illustrates a method of operation of the second wireless communications device 16, which begins at Block 51. At the second wireless communications device 16, the transmitted forward transmission blocks 20a-20c are received (Block 53). Further, the second controller 17 is illustratively configured to determine, for each forward transmission block 20a-20c, the corresponding preamble synchronization portion 22a-22c from among the predetermined set of preamble synchronization portions (Block 55). As discussed above, each member of the predetermined set of preamble synchronization portions 22a-22c has a low level of correlation to enable the second controller 17 to readily detect the particular preamble synchronization portion 22a-22c in even very distorted transmission scenarios. The second wireless communications device 16 is continuously looking for one or all of the predetermined set of preamble synchronization portions 22a-22c in a transmission. Indeed, the preamble synchronization portion 22a-22c may change for each forward transmission block. Once the second controller 17 has determined the corresponding preamble synchronization portion used in the received forward transmission block 20a-20c, the second controller uses it to synchronize receipt of the payload of the forward transmission block (Block 57). The process for the second wireless communications device 16 ends at Block 59.

In the illustrated embodiment, the first wireless communications device 11 encodes transmitted forward transmission blocks 20a-20c to use the predetermined set of preamble synchronization portions 22a-22c, and the second wireless communications device 16 uses the corresponding preamble synchronization portions in the received forward transmission blocks to synchronize receipt thereof. Of course, in other embodiments, the flow could be reversed, i.e. the transmitted forward transmission blocks go from the second 16 to the first 11 wireless communications device, and in yet other embodiments, each wireless communications device may simultaneously use the predetermined set of preamble synchronization portions 22a-22c to transmit forward transmission blocks 20a-20c therebetween.

Advantageously, the wireless communication system 10 may vary the preamble synchronization portion 22a-22c for each forward transmission block to compensate for channel conditions and data rate effectively in real time without incurring inordinate overhead. Accordingly, regardless of the transmission channel condition, the first wireless communications device 11 uses the shortest possible preamble synchronization portion 22a-22c rather than the fixed length preambles of the typical system. Moreover, since each of the wireless communications devices 11, 16 in the system 10 is programmed with the predetermined set of preamble synchronization portions 22a-22c, the changes to the preamble are on the fly and require no propagation throughout the wireless communication system 10, thereby increasing the transmission efficiency of the system. Further, a smaller percentage of each forward transmission block 20a-20c is used for the preamble synchronization portion 22a-22c and more is provided to the body portion 23a-23c, which actually carries user data. This effect is perhaps best illustrated in FIG. 4 with the varying predetermined set of preamble synchronization portions 22a-22c.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communication system comprising:
a first wireless communications device comprising a first transceiver and a first controller cooperating therewith, said first controller configured to
determine at least one received signal characteristic,
generate each forward transmission block for transmission having a preamble synchronization portion and a body portion associated therewith, and
select for each forward transmission block a desired preamble synchronization portion from among a predetermined set of preamble synchronization portions and based upon the at least one received signal characteristic, each preamble synchronization portion among the predetermined set thereof having a different length; and a second wireless communications device in communication with said first wireless communications device and comprising a second transceiver and a second controller cooperating therewith and configured to determine and use, for each forward transmission block, the corresponding preamble synchronization portion from among the predetermined set of preamble synchronization portions.

2. The wireless communication system according to claim 1 wherein said first controller is configured to select for each forward transmission block the desired preamble synchronization portion further based upon a data rate for transmission.

3. The wireless communication system according to claim 1 wherein said first controller is configured to select a desired shortest preamble synchronization portion from among the predetermined set thereof for a given at least one received signal characteristic.

4. The wireless communication system according to claim 1 wherein the predetermined set of preamble synchronization portions have correlations with each other below a threshold.

5. The wireless communication system according to claim 1 wherein the at least one received signal characteristic comprises at least one of a signal-to-noise ratio, a multipath characteristic, a Doppler spread characteristic, and an interference characteristic.

6. The wireless communication system according to claim 1 wherein the predetermined set of preamble synchronization portions comprises a series thereof with each successive preamble synchronization portion incorporating previous preamble synchronization portions.

7. A wireless communication system comprising:
a first wireless communications device comprising a first transceiver and a first controller cooperating therewith, said first controller configured to
generate each forward transmission block for transmission having a preamble synchronization portion and a body portion associated therewith, and
select for each forward transmission block a desired shortest preamble synchronization portion from among a predetermined set of preamble synchronization portions and based upon a data rate for transmission, each preamble synchronization portion among the predetermined set thereof having a different length, the predetermined set of preamble synchronization portions comprising a series thereof with each successive preamble synchronization portion incorporating previous preamble synchronization portions; and
a second wireless communications device in communication with said first wireless communications device and comprising a second transceiver and a second controller cooperating therewith and configured to determine and use, for each forward transmission block, the corresponding preamble synchronization portion from among the predetermined set of preamble synchronization portions.

8. The wireless communication system according to claim 7 wherein the predetermined set of preamble synchronization portions have correlations with each other below a threshold.

9. A wireless communications device comprising:
a transceiver; and
a controller cooperating with said transceiver and configured to
determine at least one received signal characteristic,
generate each forward transmission block for transmission having a preamble synchronization portion and a body portion associated therewith,
select for each forward transmission block a desired preamble synchronization portion from among a predetermined set of preamble synchronization portions and based upon the at least one received signal characteristic, each preamble synchronization portion among the predetermined set thereof having a different length, and
transmit each forward transmission block to a receiver wireless communications device, the receiver wireless communications device determining and using, for each forward transmission block, the corresponding preamble synchronization portion from among the predetermined set of preamble synchronization portions.

10. The wireless communications device according to claim 9 wherein said controller is configured to select for each forward transmission block the desired preamble synchronization portion further based upon a data rate for transmission.

11. The wireless communications device according to claim 9 wherein said controller is configured to select a desired shortest preamble synchronization portion from among the predetermined set thereof for a given at least one received signal characteristic.

12. The wireless communications device according to claim 9 wherein the predetermined set of preamble synchronization portions have correlations with each other below a threshold.

13. The wireless communications device according to claim 9 wherein the at least one received signal characteristic comprises at least one of a signal-to-noise ratio, a multipath characteristic, a Doppler spread characteristic, and an interference characteristic.

14. The wireless communications device according to claim 9 wherein the predetermined set of preamble synchronization portions comprises a series thereof with each successive preamble synchronization portion incorporating previous preamble synchronization portions.

15. A wireless communications device comprising:
a transceiver; and
a controller cooperating with said transceiver and configured to
generate each forward transmission block for transmission having a preamble synchronization portion and a body portion associated therewith,
select for each forward transmission block a desired shortest preamble synchronization portion from among a predetermined set of preamble synchronization portions and based upon a data rate for transmission, each preamble synchronization portion among the predetermined set thereof having a different length, the predetermined set of preamble synchronization portions comprising a series thereof with each successive preamble synchronization portion incorporating previous preamble synchronization portions, and
transmit each forward transmission block to a receiver wireless communications device, the receiver wireless communications device determining and using, for each forward transmission block, the corresponding preamble synchronization portion from among the predetermined set of preamble synchronization portions.

16. The wireless communications device according to claim 15 wherein the predetermined set of preamble synchronization portions have correlations with each other below a threshold.

17. A wireless communications device comprising:
a transceiver;
a memory configured to store a predetermined set of preamble synchronization portions, each preamble synchronization portion having a different length; and
a controller cooperating with said transceiver and said memory, and being configured to
receive a plurality of forward transmission blocks, each forward transmission block having a preamble synchronization portion and a body portion associated therewith, the preamble synchronization portion comprising a desired preamble synchronization portion from among the predetermined set of preamble synchronization portions, and
determine and use, for each received forward transmission block, the corresponding preamble synchronization portion from among the predetermined set of preamble synchronization portions, wherein the desired preamble synchronization portion comprises a desired shortest preamble synchronization portion selected from among the predetermined set thereof for a given at least one received signal characteristic.

18. The wireless communications device according to claim 17 wherein the predetermined set of preamble synchronization portions have correlations with each other below a threshold.

19. The wireless communications device according to claim 17 wherein the predetermined set of preamble synchronization portions comprises a series thereof with each successive preamble synchronization portion incorporating previous preamble synchronization portions.

20. A wireless communications device comprising:
a transceiver;
a memory configured to store a predetermined set of preamble synchronization portions, each preamble synchronization portion having a different length, the predetermined set of preamble synchronization portions comprising a series thereof with each successive preamble synchronization portion incorporating previous preamble synchronization portions; and
a controller cooperating with said transceiver and said memory, and being configured to
receive a plurality of forward transmission blocks, each forward transmission block having a preamble synchronization portion and a body portion associated therewith, the preamble synchronization portion comprising a desired shortest preamble synchronization portion from among the predetermined set of preamble synchronization portions, and
determine and use, for each received forward transmission block, the corresponding preamble synchronization portion from among the predetermined set of preamble synchronization portions.

21. The wireless communications device according to claim 20 wherein the predetermined set of preamble synchronization portions have correlations with each other below a threshold.

22. A method of operating a wireless communication system including a first wireless communications device and a second wireless communications device in communication therewith, the method comprising:
determining at least one received signal characteristic at the first wireless communications device;
generating each forward transmission block for transmission from the first wireless communications device to the second wireless communications device, each forward transmission block having a preamble synchronization portion and a body portion associated therewith;
using the first wireless communications device to select for each forward transmission block a desired preamble synchronization portion from among a predetermined set of preamble synchronization portions and based upon the at least one received signal characteristic, each preamble synchronization portion among the predetermined set thereof having a different length; and
at the second wireless communications device, determining and using, for each forward transmission block, the corresponding preamble synchronization portion from among the predetermined set of preamble synchronization portions.

23. The method according to claim 22 further comprising using the first wireless communications device to select for each forward transmission block the desired preamble synchronization portion further based upon a data rate for transmission.

24. The method according to claim 22 further comprising selecting a desired shortest preamble synchronization portion from among the predetermined set thereof for a given at least one received signal characteristic.

25. The method according to claim 22 further comprising generating at the first wireless communications device the predetermined set of preamble synchronization portions to have correlations with each other below a threshold.

26. The method according to claim 22 wherein the at least one received signal characteristic comprises at least one of a signal-to-noise ratio, a multipath characteristic, a Doppler spread characteristic, and an interference characteristic.

27. The method according to claim 22 further comprising generating at the first wireless communications device the predetermined set of preamble synchronization portions to comprise a series thereof with each successive preamble synchronization portion incorporating previous preamble synchronization portions.

28. A method of operating a wireless communications device comprising:
determining at least one received signal characteristic;
generating each forward transmission block for transmission having a preamble synchronization portion and a body portion associated therewith;
selecting for each forward transmission block a desired preamble synchronization portion from among a predetermined set of preamble synchronization portions and based upon the at least one received signal characteristic, each preamble synchronization portion among the predetermined set thereof having a different length; and
transmitting each forward transmission block to a receiver wireless communications device, the receiver wireless communications device determining and using, for each forward transmission block, the corresponding preamble synchronization portion from among the predetermined set of preamble synchronization portions.

29. The method according to claim 28 further comprising selecting for each forward transmission block the desired preamble synchronization portion further based upon a data rate for transmission.

30. The method according to claim 28 further comprising selecting a desired shortest preamble synchronization portion from among the predetermined set thereof for a given at least one received signal characteristic.

31. The method according to claim 28 further comprising generating the predetermined set of preamble synchronization portions to have correlations with each other below a threshold.

32. The method according to claim 28 wherein the at least one received signal characteristic comprises at least one of a signal-to-noise ratio, a multipath characteristic, a Doppler spread characteristic, and an interference characteristic.

33. The method according to claim 28 further comprising generating the predetermined set of preamble synchronization portions to comprise a series thereof with each successive preamble synchronization portion incorporating previous preamble synchronization portions.

34. A method of operating a wireless communications device comprising:
 storing a predetermined set of preamble synchronization portions, each preamble synchronization portion having a different length;
 receiving a plurality of forward transmission blocks, each forward transmission block having a preamble synchronization portion and a body portion associated therewith, the preamble synchronization portion comprising a desired preamble synchronization portion from among the predetermined set of preamble synchronization portions; and
 determining and using, for each received forward transmission block, the corresponding preamble synchronization portion from among the predetermined set of preamble synchronization portions, wherein the desired preamble synchronization portion comprises a desired shortest preamble synchronization portion from among the predetermined set thereof for a given at least one received signal characteristic.

35. The method according to claim 34 wherein the predetermined set of preamble synchronization portions has correlations with each other below a threshold.

36. The method according to claim 34 wherein the predetermined set of preamble synchronization portions comprises a series thereof with each successive preamble synchronization portion incorporating previous preamble synchronization portions.

* * * * *